No. 714,211. Patented Nov. 25, 1902.
H. MALIGNON.
JOINT OR PIVOTAL CONNECTION FOR DOUBLE ARMED TOOLS OR APPLIANCES.
(Application filed Jan. 10, 1902.)
(No Model.)
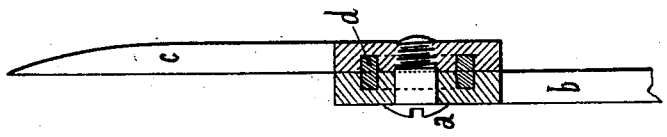
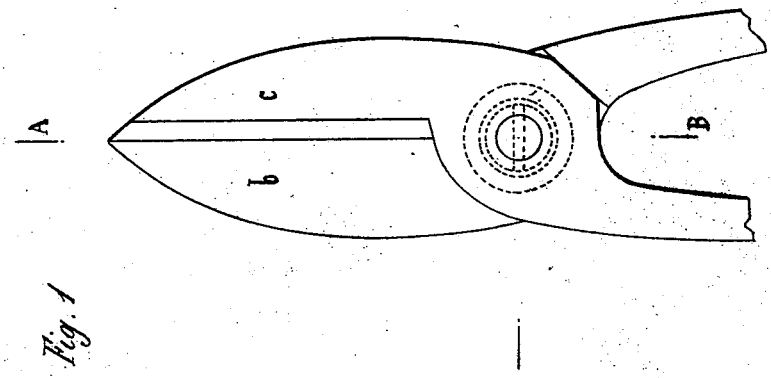

UNITED STATES PATENT OFFICE.

HIPPOLYTE MALIGNON, OF PARIS, FRANCE.

JOINT OR PIVOTAL CONNECTION FOR DOUBLE-ARMED TOOLS OR APPLIANCES.

SPECIFICATION forming part of Letters Patent No. 714,211, dated November 25, 1902.

Application filed January 10, 1902. Serial No. 89,208. (No model.)

*To all whom it may concern:*

Be it known that I, HIPPOLYTE MALIGNON, a citizen of the Republic of France, whose post-office address is at 48 Rue Claude Velfaux, Paris, in the Republic of France, have invented certain new and useful Improvements in Joints or Pivotal Connections for Double-Armed Tools or Appliances; and I do hereby declare the following to be a full, clear, and exact description of the invention, such as will enable others skilled in the art to which it appertains to make and use the same.

This invention for improvements in joints or pivotal connections for double-armed tools or appliances has for its object to provide a joint in which the resistance at right angles to the axis of motion is taken by the arms themselves through the medium of an intervening ring and is not taken by the element used to hold the two arms together.

In the accompanying sheet of illustrative drawings, Figure 1 is an elevation of a pair of shears with a joint according to this invention; and Fig. 2 is a section at A B, Fig. 1.

In carrying out this invention an annular groove $e$ is formed in the inner faces of each arm $b$ $c$ concentric with the axis about which the arms pivot and surrounding the pivot pin or screw $a$. A loose ring $d$ is placed in the grooves, which register exactly when the arms are joined and the parts secured together by the usual pivotal connection $a$, the said pivot, which may take any suitable form, serving only as a means for holding the two arms together, the resistance acting at right angles to the pivot-pin being taken on the ring $d$.

In certain appliances for heavy work it is found to be advantageous to adopt several concentrically-arranged grooves, into each of which a ring is inserted; but it is clear that in this case, as in the one above mentioned, the principle of my invention is in no way altered.

With my new joint it is impossible that the arms of the tool should jam.

This joint can be adapted to numerous appliances—for example, to shears, scissors, cutting-pliers, punching-pliers, and the like.

What I claim, and desire to secure by Letters Patent, is—

1. A pivoted joint for cutting, clipping, punching and the like tools, having two arms, comprising a pivot pin or screw connecting the two arms, and a loose ring mounted between the arms concentrically with the pin or screw, and held in opposite grooves formed in the inner faces of the arms in such a manner that the resistance acting at right angles to the pivot-pin is through the intervention of the ring taken by the arms themselves.

2. A tool or appliance consisting of two arms, a pivot pin or screw connecting the two arms, a loose bearing-ring mounted between the arms concentrically with the pin or screw and working with a sliding fit in opposite grooves formed in the inner faces of the arms so that any resistance on the arms acting at right angles to the pivot-pin is through the intermediary of the ring, taken by the arms themselves.

In testimony whereof I have affixed my signature in presence of two witnesses.

HIPPOLYTE MALIGNON.

Witnesses:
MAURICE GUILLAMAUD,
EDWARD P. MACLEAN.